April 19, 1966 H. W. FULLER 3,247,495

BINARY READOUT OF A MAGNETIC TAPE UTILIZING THE DEFLECTION OF AN ELECTRON PASSING THERETHROUGH

Filed Oct. 2, 1961 2 Sheets-Sheet 1

INVENTOR.
HARRISON W. FULLER
BY E. MacKay Fraser
ATTORNEY

INVENTOR.
HARRISON W. FULLER
BY E. MacKay Fraser
ATTORNEY 3,247,495

BINARY READOUT OF A MAGNETIC TAPE UTILIZING THE DEFLECTION OF AN ELECTRON PASSING THERETHROUGH

Harrison W. Fuller, Needham Heights, Mass., assignor to Laboratory for Electronics, Inc., Boston, Mass., a corporation of Delaware Filed Oct. 2, 1961, Ser. No. 142,058
2 Claims. (Cl. 340—174)

This invention relates in general to data processing apparatus and in particular to data processing apparatus utilizing the interaction of a focused electron beam with a magnetic film.

Some of the data processing devices known in the art are: magnetic drums, disks and tapes, toroidal core and thin film matrix arrays, and electrostatic storage tubes. Magnetic drums, disks and tapes rely on mechanical motion for gaining access to stored information and hence have large access time in addition to mechanical wear. While matrix arrays furnish fast electrical read and write properties, they require complicated and costly switching circuits for read and write access, and have relatively low information density. Electrostatic storage tubes have the disadvantage of limited storage time of information necessitating regeneration of information with the attendant danger of loss of information.

Accordingly, it is the primary object of the present invention to provide new and novel techniques for processing data.

It is another object of this invention to provide data processing apparatus having high information density, minimal access time, and permanent data storage.

It is a further object of this invention to provide data processing apparatus utilizing a focused electron beam to write data into and read data out of a magnetic film.

In the present invention, a focused beam of electrons is made to scan a magnetic film which has its magnetization restricted to lie in the plane of the film and which is substantially transparent to the beam. The information stored in the magnetic film may be represented by the presence or absence of magnetic material (using microetching techniques) or may be represented by a sequence of magnetic domains (generated by a variety of techniques). The intensity of the beam is kept sufficiently low during readout so that the magnetic film is not locally heated above the Curie point, i.e. the point above which the heated region assumes a random magnetic orientation. Upon passing through the magnetic film, the beam is deflected either to the right or to the left if the data is stored as a sequence of magnetic domains, or may remain undeviated if the data is stored as the presence and absence of material.

The deflection of the beam arises from the interaction of the electron beam with the magnetization of the magnetic film. The Lorentz force experienced by an electron in the beam can be described, in a simple model, by $$F=-\frac{4\pi e}{c}vM\sin\theta$$

where $e$ is the electronic charge, $c$ is the velocity of light, $v$ is the electron velocity, M is the magnetization of the magnetic film, and $\theta$ is the angle between the direction of motion of the electron and the direction of the magnetization. It is obvious that the magnetization need not be restricted to the plane of the film so long as $\theta$ is unequal to 90°; for maximum deflection with a beam normal to the magnetic film, however, the magnetization would lie in the plane of the magnetic film. The Lorentz force will then deflect the beam to the right or to the left depending on the sense of the magnetization M.

Electron optical means are positioned below the magnetic film to direct the beam onto a preselected point in the back focal plane of the electron optical means, the position of the point depending on whether the beam was deviated and the sense of the deviation. A knife edge or objective aperture, positioned in the back focal plane of the electron optical means, allows a beam with a preselected deviation to pass to a collector electrode while intercepting any beam not having substantially the same deviation. A similar technique by which domains may be observed is discussed in an article by Fuller, H. W. and Hale, M. E., "Domains in Thin Magnetic Films Observed by Electron Microscopy," J. Appl. Phys. 31, 1699 (1960). The collector electrode then receives an electron beam, or does not, depending on the information bearing sense of the magnetic domain being scanned or the presence or absence of magnetic material, and generates an output signal accordingly.

These and other features of the invention together with further objects and advantages thereof will become apparent from the following detailed specification with reference to the accompanying drawings in which.

Figure 1:
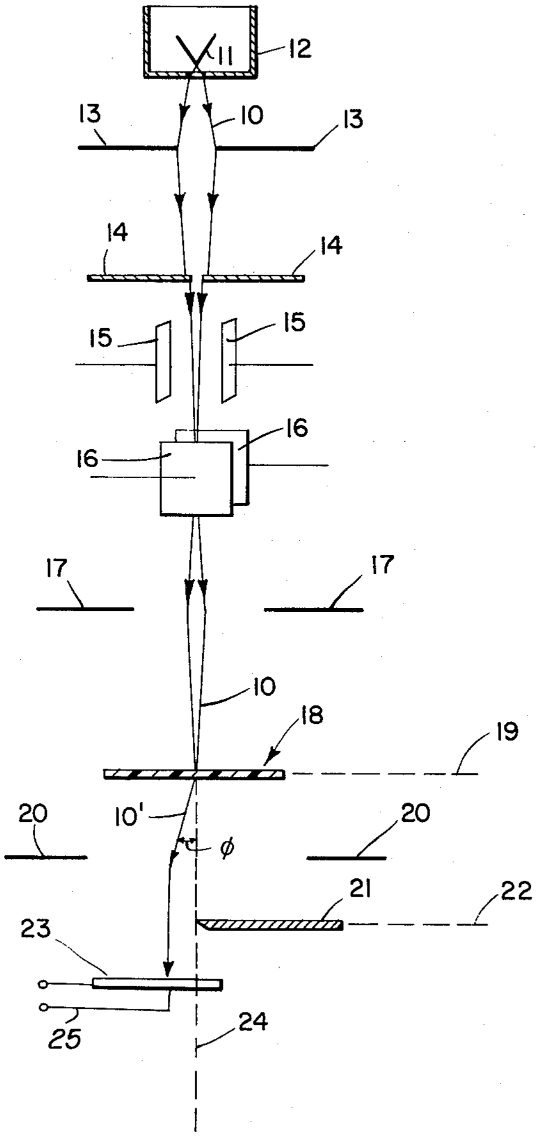
FIG. 1 is a schematic illustration of a preferred embodiment of the present invention.

The present invention may best be understood with reference to FIG. 1 in which a source of electrons 11 emits a beam 10 through an opening in a shield 12. A condenser lens 13 focuses the beam 10 onto a plate 14 having a small aperture therein to reduce the distribution of electron density of the beam 10. The beam 10 then passes through deflection plates 15 and 16 and through a reducing (or demagnifying) lens 17 which focuses the beam 10 onto a magnetic storage film 18. The deflection plates 15 and 16 may be energized (by means not shown) to make the electron beam 10 scan the magnetic storage film 18, while the reducing lens 17 reduces the electron beam 10 to a spot of the order of 100 A. in diameter. Similar techniques have been described by G. Möllenstadt and R. Speidel, "Newer Developments in Microminiaturization," Proceedings of the Third Symposium on Electron Beam Processes (copyright 1961 Alloyd Electronics Corporation). The magnetic storage film 18 is positioned in the front focal plane 19 of an objective lens 20 and a knife edge or objective aperture 21 is positioned in the back focal plane 22. It is not necessary for the operation of the invention, however, that the magnetic storage film 18 be positioned in the front focal plane 19. The electron beam 10 emerges from the magnetic storage film 18 as the beam 10' making an angle $\phi$ with the optical axis 24 of the objective lens 20. The objective lens 20 focuses the beam 10' emerging from any part of the magnetic storage film 18 with the angle $\phi$ onto a preselected point in the back focal plane 22, while the knife edge 21 intercepts any beam not making substantially the angle $\phi$ with the optical axis 24; this method of operation will be more fully explained with reference to FIG. 2. The beam 10' then falls on a collecting electrode 23 which generates an output signal across leads 25.

The electron beam 10 may also be used to write the data into the magnetic storage film 18. During the writing cycle, the intensity of the beam 10 is selectively controlled to raise the temperature of a localized part of the magnetic storage film 18 above the Curie point. A magnetic writing field (not shown) may then be used to orient the localized part in accordance with the information to be stored. If the magnetic storage film 18 has been prealigned in one direction, the demagnetizing field of the regions adjacent the localized part can be used to oppositely orient the direction of magnetization of the localized part. This latter technique is similar to that described by L. Mayer, "Curie Point Writing on Magnetic Film," J. Appl. Phys. 29, 1003 (1958) and also J. Appl. Phys. 29, 1454 (1958).

Figures 2, 3:
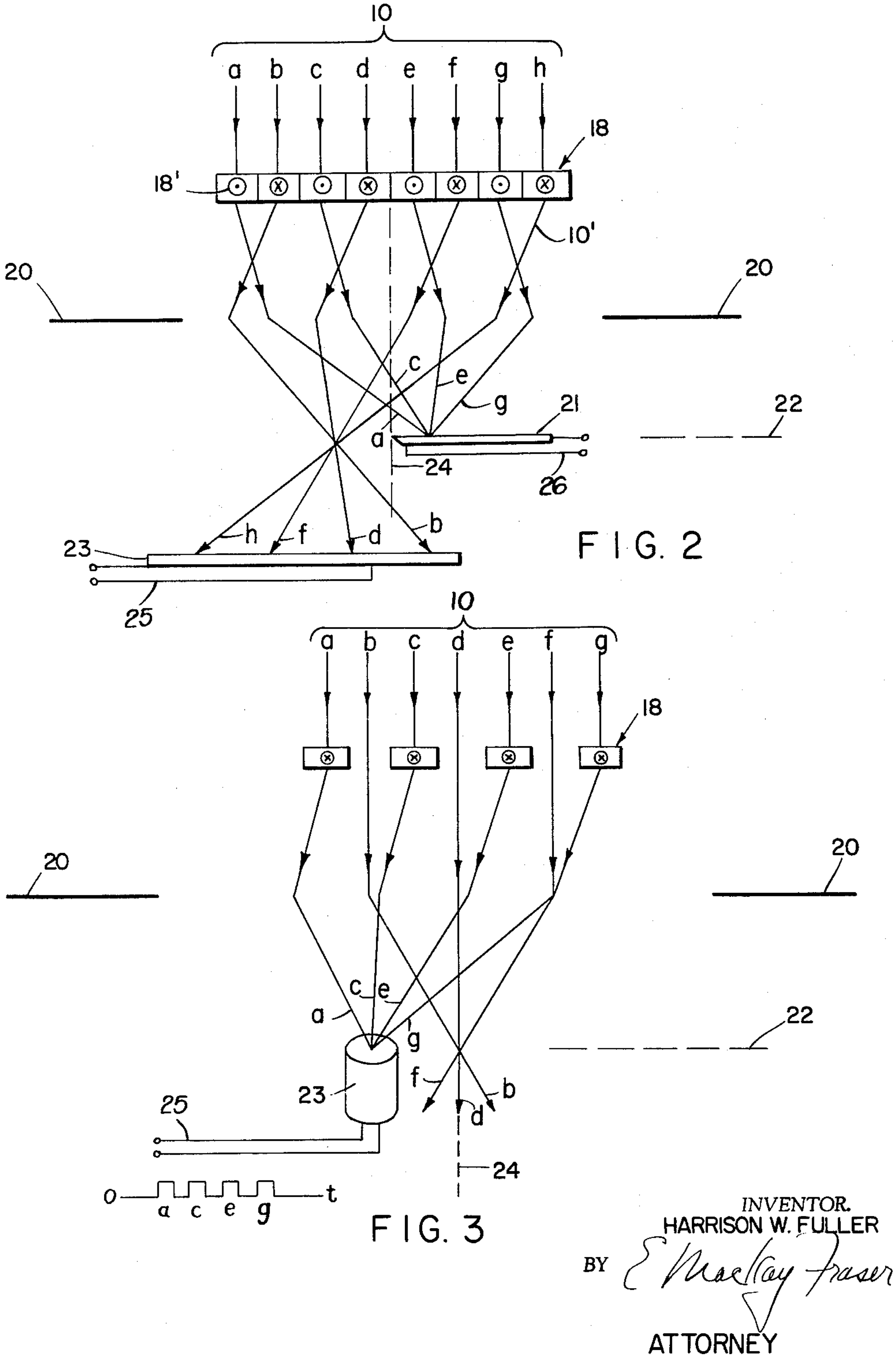
FIG. 2 illustrates in greater detail the method of readout in FIG. 1.
FIG. 3 illustrates schematically a second method of readout.

In FIG. 2, the electron beam 10 scans the magnetic storage film 18 from left to right; the position of this scanning beam is represented in time sequence by a series of beams (*a*)–(*h*). The magnetic storage film 18 is divided into a sequence of oppositely oriented domains 18'. Upon passage through the magnetic storage film 18, the beams (*a*), (*c*), (*e*), and (*g*) are deflected toward the right, while the beams (*b*), (*d*), (*f*), and (*h*) are deflected toward the left. The objective lens 20 then focuses beams (*a*), (*c*), (*e*), and (*g*) onto a preselected point on the knife edge 21 positioned in the back focal plane 22. The knife edge 21 is adapted in this embodiment, however, to generate an output signal which appears across leads 26. The beams (*b*), (*d*), (*f*), and (*h*) are also focused onto a preselected point in the back focal plane 22 but are not intercepted by the knife edge 21 and fall upon a collecting electrode 23 which also generates an output signal across leads 25.

In FIG. 3 the position of the scanning beam 10 is represented in time sequence by a series of beams (*a*)–(*g*). The magnetic storage film 18 stores data as the presence of magnetic material or the absence thereof. Beams (*a*), (*c*), (*e*), and (*g*) pass through the magnetic storage film 18 and are deviated to the left; beams (*b*), (*d*), and (*f*) remain undeviated. The objective lens 20 focuses the undeviated beams (*b*), (*d*), and (*f*) onto the intersection of the back focal plane 22 and the optical axis 24, while the deviated beams (*a*), (*c*), (*e*), and (*g*) are focused at a preselected point in the back focal plane 22 away from the optical axis 24. A collecting electrode 23 is positioned on the back focal plane 22 to receive the deviated beams (*a*), (*c*), (*e*), and (*g*); in this embodiment the knife edge 21 in FIG. 2 is not necessary. A sample waveform is shown of the output signal appearing across the output leads 25 as the beam 10 scans the magnetic storage film 18.

The techniques illustrated and described above thus permit the readout of data stored at high density with minimal access time and high resolution. In addition the apparatus described can also be utilized in the initial storage of the data.

Having thus described the invention it will be apparent that numerous modifications and departures may now be made by those skilled in the art, all of which fall within the scope contemplated by the invention. Consequently the invention herein described is to be construed to be limited only by the spirit and scope of the appended claims.

What is claimed is:

1. Apparatus for determining the magnetic state of unit volumes of a magnetic film, comprising:

(a) means for generating an electron beam;

(b) means for scanning the electron beam across a surface of the film to change, upon passing through the film, the direction of such beam from a first to a second direction in accordance with the magnetic state of each unit volume of the film;

(c) means for focussing, at a first focal point in a focal plane, electrons travelling in the first direction and, at a second focal point in the focal plane, electrons travelling in the second direction; and, (d) means for deriving a continuous electric signal proportional to the difference in the number of electrons impinging on the first and the second focal point.

2. Apparatus for determining the magnetic state of unit volumes of a magnetic film, comprising:

(a) means for sequentially irradiating each unit volume of the magnetic film with a beam of electrons;

(b) means, including an electrostatic focussing lens, for focussing electrons in a focal plane at points thereon removed from the center thereof;

(c) an electron-opaque diaphragm disposed in the focal plane to intercept electrons impinging thereon; and, (d) means for generating an electric signal in accordance with the number of electrons passing by the opaque diaphragm.

References Cited by the Examiner

UNITED STATES PATENTS 3,059,538 10/1962 Sherwood ---------- 340—174

OTHER REFERENCES

Pages 52–56, April 1, 1954, Publication I, "Magnetic Domains by the Longitudinal Kerr Effect," by Fowler and Fryer, Physical Review, vol. 94, No. 1.

Pages 18–19, February 1959, Publication II, "Magneto-Optic Hysteresigraph," by Hart, IBM Technical Disclosure Bulletin, vol. 1, No. 5.

Page 42, December 1959, Publication III, "Magnetic Recording Technique," by Hagopian, IBM Technical Disclosure Bulletin, vol. 2, No. 4.

IRVING L. SRAGOW, *Primary Examiner.*

R. J. McCLOSKEY, A. I. NEUSTADT, *Assistant Examiners.*